Nov. 9, 1926.  
K. J. RASMUSSEN  
1,605,985  
PNEUMATIC FOOT AND ARCH SUPPORT  
Filed August 5, 1925  2 Sheets-Sheet 2
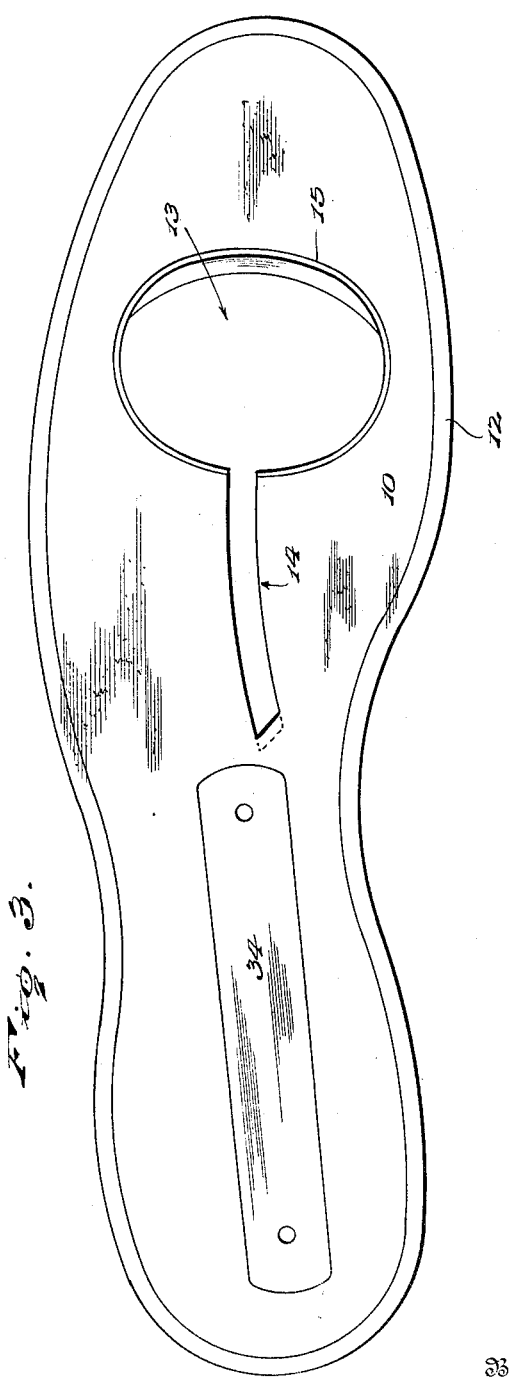
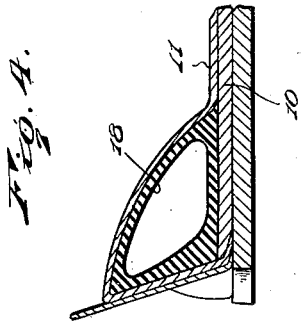
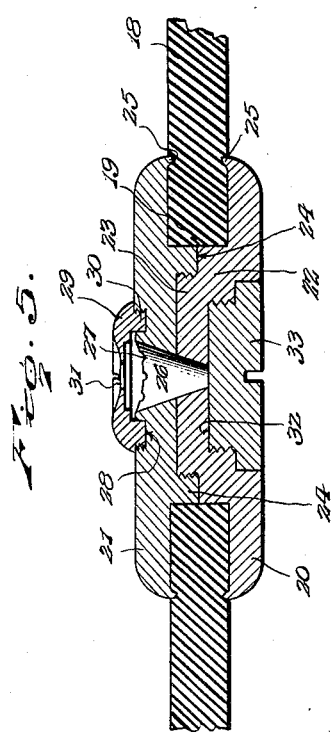
Inventor  
K. J. Rasmussen.

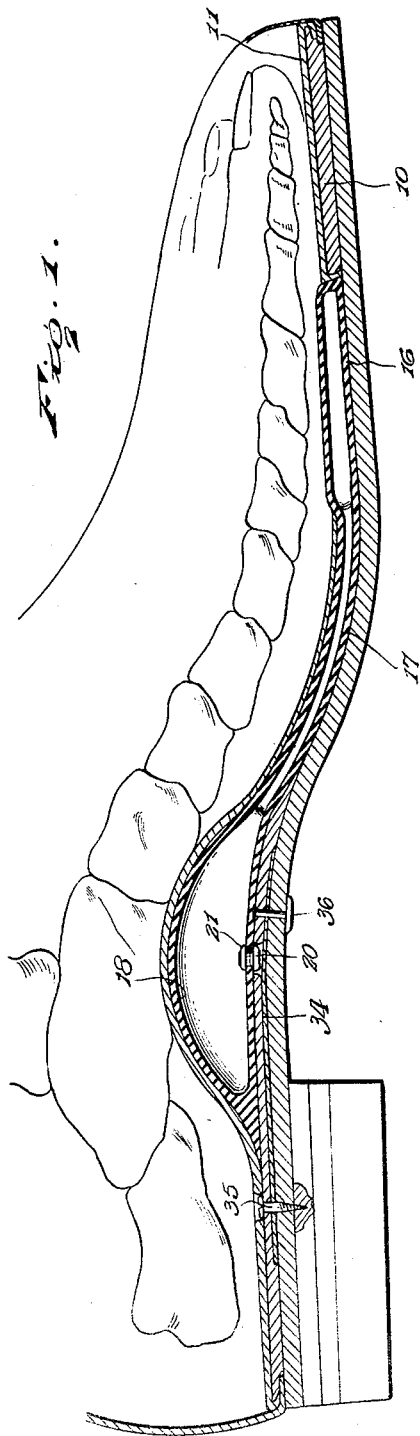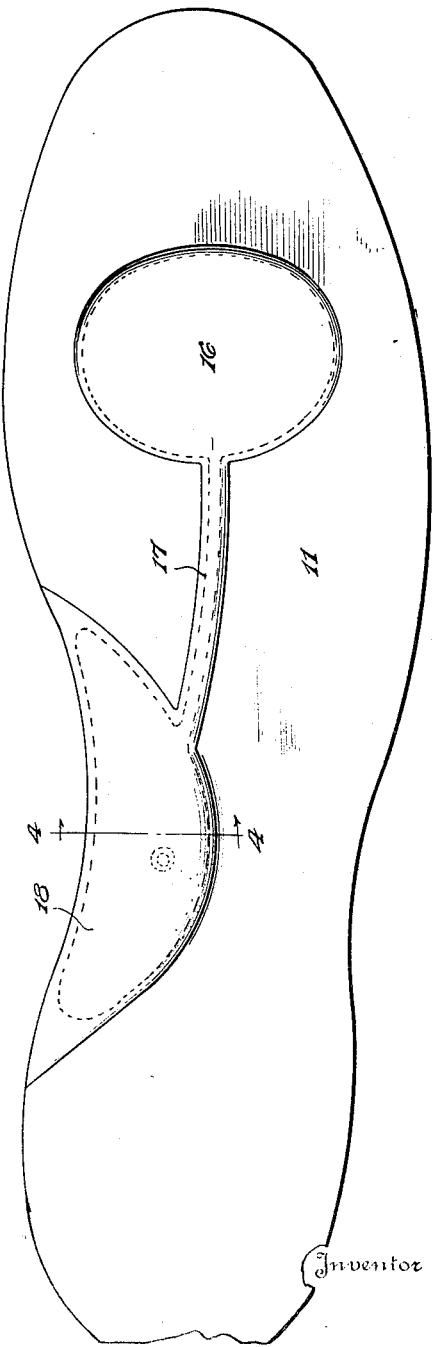

Patented Nov. 9, 1926.

1,605,985

UNITED STATES PATENT OFFICE.

KARL J. RASMUSSEN, OF MADERA, CALIFORNIA.

PNEUMATIC FOOT AND ARCH SUPPORT.

Application filed August 5, 1925. Serial No. 48,356.

This invention relates to an improved pneumatic foot and arch support and seeks, among other objects, to provide a device of this character which will provide comfortable standing or walking for persons suffering with foot troubles.

The invention seeks, as a further object, to provide a support which will embody an air bag cushion for the ball of the foot as well as an air bag cushion for the arch of the foot, and wherein the latter cushion will serve as an arch support.

A further object of the invention is to provide a support embodying a novel valve whereby the air bags may be inflated.

And the invention seeks, as a still further object, to provide a support adapted for general use and which may be readily installed.

Other objects of the invention not above specifically mentioned will appear as the description proceeds.

In the accompanying drawings:

Figure 1 is a sectional view showing my improved support installed in a shoe and illustrating the manner in which the rear air bag cushion is adapted to support the arch of the foot.

Figure 2 is a top plan view of the support.

Figure 3 is a bottom plan view of the support, the air bags being removed.

Figure 4 is a detailed sectional view on the line 4—4 of Figure 2, looking in the direction indicated by the arrows.

Figure 5 is an enlarged sectional view of the inflating valve.

In carrying the invention into effect I employ an insole embodying a relatively thick bottom ply 10 which is preferably of suitable sole leather, and overlying the bottom ply is a relatively thin top ply 11 which is preferably of suitable soft pliable leather. The margins of the top ply are, as shown in Figure 3, turned down across the edges of the bottom ply to form an encircling lip 12 adhesively or otherwise secured to the lower face of the bottom ply, and formed through both plies at the ball of the insole is an elliptical opening 13 from which extends a rearwardly directed slot 14 having a beveled rear end wall sloping to the upper face of the ply 10. As also brought out in Figure 3, the margins of the top ply 11 are turned downwardly through the opening 13 to form an encircling lip 15 adhesively or otherwise secured to the lower face of the bottom ply while, as brought out in Figure 1, said opening is gradually contracted toward the upper face of the top ply. The opening is thus provided with an inclined wall.

Fitting in the opening 13 is a pliable tread bag 16 from which extends a tube 17 lying in the slot 14, and integral with the tube at its rear end is a more or less crescent-shaped pliable arch bag 18 disposed adjacent the inner side edge of the insole medially thereof. The bags 16 and 18 as well as the tube 17 are preferably of rubber or a composition thereof and, as will be observed upon reference to Figure 1, the bag 16 is formed with a sloping peripheral wall to seat flat against the sloping wall of the opening 13 so that said bag is thus held against upward displacement through said opening. Furthermore, as will be observed, the tube 17 is countersunk in the slot 14 throughout the major portion of the length of the tube while the rear end portion of the tube lies flat against the sloping rear end wall of said slot. Abrasion of the tube at this point is thus avoided.

The bottom wall of the bag 18, as shown in detail in Figure 5, is formed centrally with an opening 19, and overlying said opening at opposite sides of the wall of the bag are mating circular plates 20 and 21. The plate 20 is formed centrally with a boss 22 which freely fits in the opening 19 and is stepped externally to define a threaded terminal 23 at the base of which is an annular shoulder 24 while the plate 21 is provided with an annular flange 24' which freely fits in the opening 19 and is screwed over the terminal 23 of said boss to seat against the shoulder 24. The plates are thus rigidly connected and formed on the peripheries of the plates are inturned annular lips 25 which are disposed to sink into the wall of the bag to provide a rigid sealed connection between the plates and said wall. Formed through the plate 21 and through the bottom wall of the boss 22 are mating conical openings and fitting in said openings is a preferably rubber conical valve 26, the larger inner end of which is provided with a concave face having grooves 27 therein. Surrounding the valve opening of the plate 21 is an annular channel 28 and overlying the valve is a cap 29 having a flange 30 screwed in said channel. The cap is internally recessed to permit the inward movement of the valve to open position and formed in the cap centrally thereof is an air passage 31. Thus, as will be seen, the cap will limit the valve against inward displacement while, when the valve is opened, air may flow between the valve and cap through the grooves 27 of the valve to enter the air bag at the passage 31 through the cap. The boss 22 of the plate 20 is internally stepped to form a socket 32 having a closure plug 33 which is screwed in said socket and, preferably, the socket is of a size to accommodate the threaded hose connection of an ordinary air pump so that said connection may be screwed into the socket and the pump operated for inflating the bags 16 and 18 with air. When said bags are inflated the air pressure will, of course, press the valve 26 closed and tightly hold said valve in closed position.

Preferably, the top ply 11 is arranged to overlie the bag 18 and cover the slot 17 so that said top ply will thus hold said air bag in proper position. Overlying the bottom ply to extend forwardly from the heel portion thereof beneath said air bag is a flat reenforcing spring 34.

In Figure 1 of the drawings, I have shown my improved support in position within a conventional shoe. As will be observed, the spring 34 rests flat against the sole of the shoe to extend forwardly from the heel portion thereof partially across the shank of the shoe sole, and extending through said support and through said spring is a screw 35 screwed into the shoe heel for anchoring the spring near its rear end as well as anchoring the support. Extending through the shank of the shoe and through the bottom ply 10 is a rivet or other suitable fastening device 36 anchoring the spring near its forward end. The spring will thus reinforce the shank of the shoe sole as well as the shank of the insole for yieldably supporting the weight imposed upon the air bag 18. As will be observed, the air bag 16 is positioned beneath the ball of the foot to provide a cushion therefor while the air bag 18 is positioned beneath the arch of the foot for supporting and cushioning the foot at the arch thereof. Furthermore, as the weight is thrown on the ball of the foot, incident to walking, the air in the bag 16 will be forced through the tube 17 to the bag 18 so that this bag will be distended more or less and its rigidity thus increased to receive the weight imposed on the foot at the time the heel strikes the ground. The arch of the foot will thus be efficiently supported at the time most needed. As will, of course, be understood, the device may be directly built into the structure of a shoe or constructed as a separate article to be inserted in the shoe by the user.

Having thus described the invention, what I claim is:

1. A pneumatic foot and arch support including an insole provided at the ball thereof with an opening tapered toward the upper side of said insole, a tapered air bag fitting in said opening and limited by the wall thereof against upward displacement, a second air bag carried by the insole and disposed to support the arch of the foot, and a tube connecting said air bags.

2. A pneumatic foot and arch support including an insole provided at the ball thereof with an opening and formed with a slot extending rearwardly from said opening and having its rear end beveled upwardly, an air bag disposed in said opening for supporting the ball of the foot, a second air bag resting on the insole and disposed to support the arch of the foot, and a tube connecting said air bags and accommodated in said slot and supported adjacent the second air bag by the beveled rear end of the slot.

3. A pneumatic foot and arch support including an insole having top and bottom plies, both of said plies being formed at the ball of the insole with an opening and said bottom ply being provided with a slot extending rearwardly from said opening, an air bag wedged in said opening and limited by the wall thereof against upward displacement, a second air bag positioned between said plies and disposed to support the arch of the foot, and a tube connecting said air bags and disposed in said slot beneath said top ply.

In testimony whereof I affix my signature.

KARL J. RASMUSSEN. [L. S.]